United States Patent
Sohn et al.

(10) Patent No.: US 11,827,098 B2
(45) Date of Patent: Nov. 28, 2023

(54) CAMERA MONITOR SYSTEM FOR RESPONDING TO AMOUNT OF LIGHT

(71) Applicants: HYUNDAI MOTOR COMPANY, Seoul (KR); KIA CORPORATION, Seoul (KR); SL MIRRORTECH CORPORATION, Siheung-si (KR)

(72) Inventors: Chang Woo Sohn, Seoul (KR); Ill Soo Kim, Suwon-si (KR); Choon Gi Jung, Seoul (KR); Young Nam Shin, Siheung-si (KR); Dong Gun Yeo, Gyeongsan-si (KR); Hyung Sik Yoon, Gyeongsan-si (KR); Young Hoon Lee, Siheung-si (KR); Dae Man Son, Siheung-si (KR); Jin Woo Kim, Siheung-si (KR); Yong Hwan Kim, Siheung-si (KR); Hyun Seok Song, Gyeongsan-si (KR)

(73) Assignees: HYUNDAI MOTOR COMPANY, Seoul (KR); KIA CORPORATION, Seoul (KR); SL MIRRORTECH CORPORATION, Siheung-si (KR)

(*) Notice: Subject to any disclaimer, the term of this patent is extended or adjusted under 35 U.S.C. 154(b) by 238 days.

(21) Appl. No.: 17/540,124

(22) Filed: Dec. 1, 2021

(65) Prior Publication Data

US 2022/0324324 A1 Oct. 13, 2022

(30) Foreign Application Priority Data

Apr. 12, 2021 (KR) .................. 10-2021-0047021

(51) Int. Cl.
*B60K 35/00* (2006.01)

(52) U.S. Cl.
CPC ........ *B60K 35/00* (2013.01); *B60K 2370/119* (2019.05); *B60K 2370/152* (2019.05); *B60K 2370/176* (2019.05); *B60K 2370/21* (2019.05); *B60K 2370/345* (2019.05); *B60K 2370/349* (2019.05); *B60K 2370/52* (2019.05)

(58) Field of Classification Search
None
See application file for complete search history.

(56) References Cited

U.S. PATENT DOCUMENTS

2012/0314075 A1 12/2012 Cho
2018/0164114 A1* 6/2018 Chiu .................. G01C 21/3697

FOREIGN PATENT DOCUMENTS

KR 100959347 B1 5/2010

* cited by examiner

*Primary Examiner* — Mark T Monk
(74) *Attorney, Agent, or Firm* — LEMPIA SUMMERFIELD KATZ LLC

(57) ABSTRACT

A camera monitor system for responding to an amount of light includes: a sensor unit configured to measure an amount of external light of a vehicle; a camera unit configured to capture an image of an outside of the vehicle; a display unit comprising a first display layer configured to display the image of the outside, captured by the camera unit, and a second display layer configured to display at least one icon at least partially overlapping the first display layer; and a controller configured to set luminance of the first display layer in response to the amount of external light received from the sensor unit and to change transparency of the icon of the second display layer.

12 Claims, 4 Drawing Sheets

FIG. 5

(BRIGHTNESS VALUE:
COMPARISON OF MAXIMUM BRIGHTNESS VALUE OF BRIGHTNESS OF MONITOR)

| STEP | DAYTIME | | NIGHTTIME | |
|---|---|---|---|---|
| | BRIGHTNESS VALUE | TRANSPARENCY | BRIGHTNESS VALUE | TRANSPARENCY |
| 1 | 20% | 25 | 2% | 45 |
| 2 | 30% | 20 | 5% | 45 |
| 3 | 40% | 15 | 10% | 40 |
| 4 | 50% | 10 | 15% | 35 |
| 5 | 60% | 5 | 20% | 30 |
| 7 | 80% | 0 | 25% | 25 |
| 8 | 100% | 0 | 30% | 20 |

CAMERA MONITOR SYSTEM FOR RESPONDING TO AMOUNT OF LIGHT

CROSS-REFERENCE TO RELATED APPLICATION

This application claims under 35 U.S.C. § 119(a) the benefit of priority to Korean Patent Application No. 10-2021-0047021 filed on Apr. 12, 2021, the entire contents of which are incorporated herein by reference.

BACKGROUND

(a) Technical Field

The present disclosure relates to a camera monitor system for responding to an amount of light, and more particularly to technology for providing a camera monitor system for easy recognition of a user by controlling a display unit installed in a vehicle in response to the amount of external light outside of a vehicle.

(b) Background Art

With recent development of image acquisition and display technology, a monitoring device has been developed for displaying, on a display unit, information on, related to, or obtained from an image of the outside environment or surroundings of a vehicle acquired by a device for securing a visual field. The technology may replace an existing side mirror for checking information on or about the surroundings, i.e., the outside (e.g., side and rear) of a vehicle. The technology includes a camera and allows a user to check the information on the image of the outside.

A vehicle including the aforementioned camera monitor system for monitoring the outside of the vehicle is equipped with side cameras having a small size for capturing images around the vehicle on the left and right sides of the vehicle instead of existing side mirrors. In addition, an image signal acquired by the side camera is processed and displayed through a side display unit inside the vehicle. A driver checks an external situation of the vehicle through the image information displayed on the display unit.

FIG. 1 illustrates a camera for viewing the left, right, and rear sides of a vehicle, according to the configuration disclosed in Korean Patent Publication No. 10-0959347 ("Patent Document 1"). Patent Document 1 provides a camera monitor system for monitoring the outside of a vehicle in the form of one integrated body 10. The body 10 may include an integrated configuration including a camera 14, a display unit 12. a controller, a camera housing 13, and a monitor housing 11 may also be configured as a single body 10.

As in Patent Document 1, in the case of a vehicle including the camera monitor system for monitoring the outside of the vehicle, when the vehicle drives, the image of the outside of the vehicle is displayed on the display unit 12, thereby providing convenience for driving. However, there is a problem in that it is impossible to provide control of various icons displayed on the display unit 12 based on the amount of external light of the vehicle.

In other words, there is a problem in that it is impossible to provide a control method related to recognition of various icons displayed on the display unit in response to the amount of external light of the vehicle when the vehicle drives.

SUMMARY OF THE DISCLOSURE

In one aspect, the present disclosure provides a camera monitor system for responding to the amount of external light of a vehicle.

In another aspect, the present disclosure provides a camera monitor system for controlling the transparency of an icon as well as the luminance of a display unit in response to the amount of external light.

The technical problems solved by the embodiments are not limited to the above technical problems. Other technical problems, which are not described herein, should become apparent to those having ordinary skill in the art from the following description.

The camera monitor system for responding to the amount of light for achieving the aforementioned objective of the present disclosure may have the following features.

In one aspect, the present disclosure provides a camera monitor system for responding to an amount of light. The camera monitor system includes: a sensor unit configured to measure an amount of external light outside of a vehicle; a camera unit configured to capture an image of an outside of the vehicle; a display unit including a first display layer configured to display the image of the outside, captured by the camera unit, and a second display layer configured to display at least one icon and at least partially overlapping the first display layer; and a controller configured to set a luminance of the first display layer in response to the amount of external light received from the sensor unit and to change transparency of the at least one icon of the second display layer.

When the amount of external light measured by the sensor unit is equal to or greater than a first reference value, the controller may set a daytime mode. Also, when the amount of the external light is less than the first reference value, the controller may set a nighttime mode.

When the luminance is controlled in response to the amount of external light measured by the sensor unit, the controller may be configured to control the transparency of the at least one icon of the second display in response to the luminance.

The controller may be configured to determine the importance of the at least one icon and to control chromaticity of the at least one icon having relatively high importance.

The controller may be configured to simultaneously control chromaticity and transparency depending on the importance of the at least one icon.

The controller may store a luminance value of the first display layer in response to the amount of external light.

The controller may store the transparency of the at least one icon of the second display layer in response to a luminance value determined based on the amount of external light measured by the sensor unit.

The at least one icon positioned on the second display layer may include at least one of blind spot detection (BSD) icon, a rear guide line icon, a side guide line icon, or a door opening icon.

The controller may be configured to control the transparency of a region of the second display, in which the at least one icon is positioned.

The controller may be configured to measure a position of a light source, input through the sensor unit, and to simultaneously or individually control the first display layer and the second display layer, which are respectively positioned at left and right sides of the display, depending on the measured position.

BRIEF DESCRIPTION OF THE DRAWINGS

The above and other features of the present disclosure are now described in detail with reference to certain embodiments thereof illustrated in the accompanying drawings which are given hereinbelow by way of illustration only, and thus are not limitative of the present disclosure, and wherein:

FIG. 5 is a diagram showing a table for controlling the transparency of an icon of a camera monitor system for responding to the amount of light according to an embodiment of the present disclosure.

DETAILED DESCRIPTION

Figure 1:
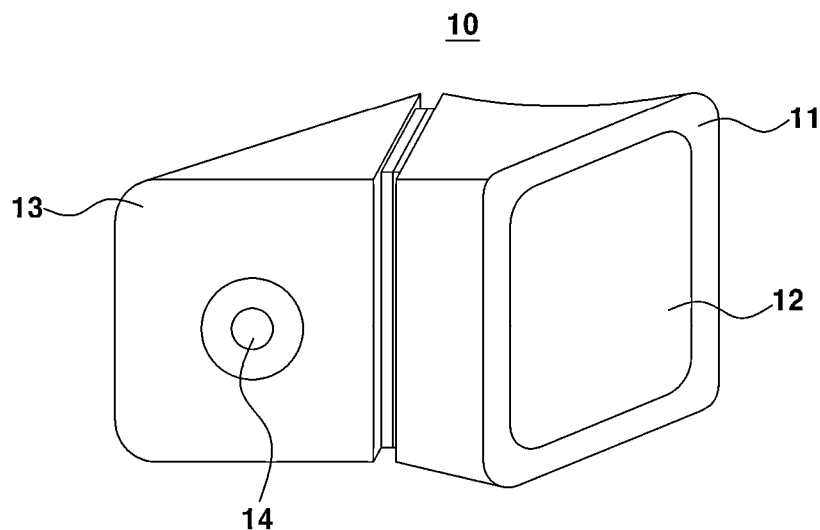
FIG. 1 is a diagram showing the configuration of a conventional camera monitor system.

The present disclosure is now described more fully with reference to the accompanying drawings, in which embodiments of the present disclosure are shown. The present disclosure may, however, be embodied in many different forms and should not be construed as being limited to the embodiments set forth herein. Rather, these embodiments are provided so that this disclosure is thorough and complete, and fully conveys the concept of the present disclosure to those having ordinary skill in the art.

Terms such as "unit" or "module", etc., should be understood to indicate units that process at least one function or operation and that may be embodied in a hardware manner, a software manner, or a combination of a hardware manner and a software manner. When a component, device, element, or the like of the present disclosure is described as having a purpose or performing an operation, function, or the like, the component, device, or element should be considered herein as being "configured to" meet that purpose or to perform that operation of function.

In addition, terms such as "daytime" and "nighttime" described in the specification may be interpreted as a relative concept with respect to the amount of light of a light source outside the vehicle.

In addition, the term "luminance" described in the specification relates to the brightness of a display. High brightness means that a brightness value of the display is relatively high. Moreover, in the present disclosure, the set luminance of a first display may be interpreted as a percentage of the maximum luminance value.

In addition, the term "transparency" described in the specification means a degree of transparency of an icon. High transparency means that the icon is controlled to be relatively transparent.

The present disclosure relates to a camera monitor system 10 for responding to the amount of external light around a vehicle and provides technology for controlling the luminance of a display unit 300 of the camera monitor system 10 and the transparency of an icon 321 in response to the amount of light received from an external light source in a vehicle including the camera monitor system 10.

The camera monitor system 10 according to the present disclosure may be positioned inside housings or cases, respectively, which are positioned on opposite side surfaces of the vehicle and which are exposed outside the vehicle. The camera monitor system 10 may be configured to capture images of a rear of the vehicle, i.e., behind the vehicle, and/or images of the opposite side surfaces, i.e., alongside the vehicle, and to display the images in the interior of the vehicle. The camera monitor system 10 may include multiple camera units respectively positioned at the rear and/or on the opposite side surfaces of the vehicle (not shown) and that may be controlled individually or simultaneously. The vehicle may instead include multiple camera monitor systems, one for each camera, for the rear of the vehicle and/or the left and right sides of the vehicle.

Figure 2:
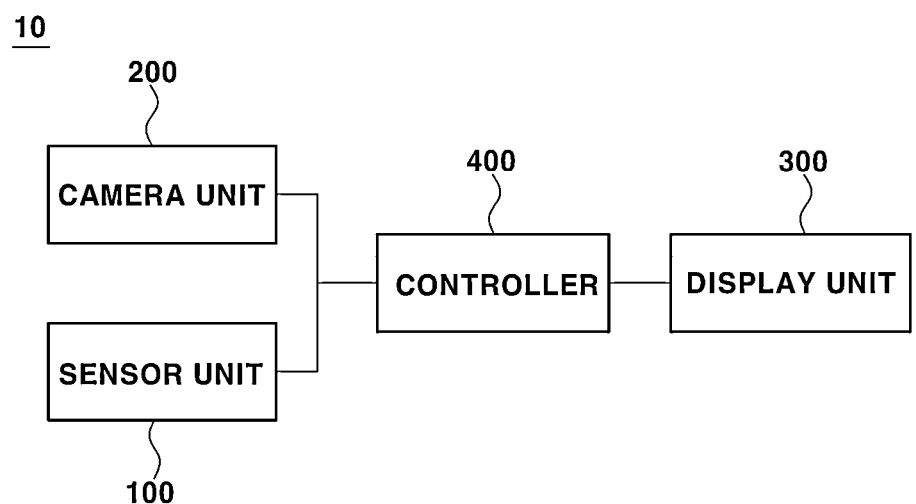
FIG. 2 is a diagram showing the configuration of a camera monitor system for responding to the amount of light according to an embodiment of the present disclosure.

FIG. 2 provides an illustration of the camera monitor system 10 for monitoring the outside of a vehicle, i.e., the surroundings or the outside or exterior environment around the vehicle according to an embodiment of the present disclosure The camera monitor system 10 for monitoring the outside may include a camera unit 200, a display unit 300, and a controller 400.

The camera unit 200 according to the present disclosure may include a movable lens (not shown) that moves up, down, left, and right around a center. The movable lens may be adjusted through a direction adjustment button installed inside a vehicle (not shown).

The camera unit 200 may have a linear or round extension (not shown) in which an upper end of a side mirror case extends forwards (towards the rear side of the vehicle). Accordingly, the extension may function as a shade or an umbrella for protecting a lens part of the camera unit 200 and thus may allow a driver to ensure a clear visual field against rain or snow while the vehicle drives.

In one example, an image of the outside of the vehicle, captured by a camera unit 200 positioned outside the opposite side surfaces of the vehicle, may be provided to a driver through the display unit 300 positioned inside the vehicle. As such, the display unit 300 according to the present disclosure may be positioned inside the vehicle, and thus may be a component positioned in an 'A' pillar or a window of the vehicle.

The display unit 300 may include a liquid crystal display (LCD), a light emitting diode (LED), or an organic light emitting diode (OLED). In detail, the display unit 300 according to the present disclosure may include an organic light emitting diode (OLED) inserted into the 'A' pillar or an inner side surface of a door of the vehicle.

The display unit 300 according to the present disclosure may include a first display layer 310 and a second display layer 320. The first display layer 310 may be controlled by the controller 400 to display the image of the outside of the vehicle, captured through the camera unit 200. The second display layer 320 may include a plurality of icons 321 that are recognizable by a user and may be configured to light up. The second display layer 320 may at least partially overlap the first display layer 310 and the transparency of at least a region of the second display layer 320 may be separately controlled. In detail, the second display layer 320 may include the plurality of icons 321 and at least some of the icons 321 may be positioned in different regions of the second display layer 320. Accordingly, some regions of the second display layer 320 may be independently controlled to control the transparency of an icon.

According to an embodiment of the present disclosure, the first display layer 310 may include a backlight 311. The controller 400 may control the brightness of the backlight 311 to control the luminance of an image displayed on the first display layer 310. According to another embodiment of the present disclosure, the controller may be configured to correct the luminance of the image displayed on the display unit 300 through an image processor 420.

In other words, the luminance of the image displayed on the display unit 300 may be corrected through control of the brightness of display unit 300 or by image correction through the controller, as described above. In addition, the camera monitor system 10 according to the present disclosure may use any method for controlling the luminance of the image displayed on the display unit 300.

The controller 400 according to the present disclosure may display the image of the outside, received from the camera unit 200, on the display unit 300. Thus, an image display angle, or an image display height or width may be displayed according to a user request. The controller 400 may set an initial luminance value of the first display layer 310 in response to a user input request and may set initial transparency of an icon of the second display layer 320.

Power may be applied to the controller 400 used in a control method of the camera monitor system 10 for monitoring the outside of the vehicle according to the present disclosure through a battery integrated into the vehicle and a battery attached to the system. Power for driving the system may be applied to the controller 400 through a plurality of relays connected to the battery and corresponding to each component of the controller 400.

A sensor unit 100 may be positioned on an upper surface of a windshield of the vehicle or positioned to face the outside of the vehicle. The sensor unit 100 may measure the amount of external light of the vehicle and may measure the position of an external light source outside of the vehicle in front and rear directions and/or in left and right directions in real time. In detail, the sensor unit 100 according to the present disclosure may include at least one illumination sensor 110 positioned on an inner side surface of a windshield of the vehicle.

According to an embodiment, the sensor unit 100 may be configured to receive information on the position of a light source positioned outside the vehicle and on the amount of light. In detail, the illumination sensor 110 including two or more measurers (e.g., sensors) may measure the position of the light source in left and right directions and a longitudinal direction of the vehicle by analyzing a path of light input to each measurer. The luminance of the display unit 300 and the transparency of the one or more icons 321 of each of camera unit 200 or camera monitor system 10 positioned at left and right sides, i.e., the opposite side surfaces of the vehicle, may be separately controlled in response to the measured position of the light source.

For example, when a light source positioned at a left side of the vehicle is present, the luminance of the first display layer 310 positioned at the left side may be set to be higher than the luminance of the first display layer 310 positioned at a right side. In addition, the transparency of the icon 321 of the second display layer 320 positioned at the left side may be set to be relatively low compared with the transparency of the icon 321 of the second display layer 320 positioned at the right side.

In other words, in one example, the camera monitor system 10 positioned in a region close to a light source may be configured to set the luminance of the display unit 300 to be higher than the luminance of the display unit 300 positioned away from the light source. In addition, the transparency of the icon 321 of the camera monitor system 10 positioned in a region close to the light source may be set to be lower than the display unit 300 positioned away from the light source.

As such, the sensor unit 100 according to the present disclosure may transmit information on the measured amount of light and the position of the light source to the controller 400. The controller 400 may be configured to control the camera monitor system 10 for responding to the amount of light based on the received amount of light and the position of the light source.

The controller 400 in one example may be configured to control the luminance of the first display layer 310 of the camera monitor systems 10 positioned on the opposite side surfaces of the vehicle in response to the amount of light and may be configured to simultaneously or sequentially control the transparency of the icon 321 of the second display layer 320.

The controller 400 may be configured to store a set luminance value of the first display layer 310 in response to the amount of external light of the vehicle and to control the luminance of the first display layer 310 by applying (e.g., based on) the amount of light measured by the sensor unit 100. The controller 400 may be configured to store a setting value of the transparency of the icon 321 in response to the luminance of the first display layer 310 and to apply the setting value to the second display layer 320. Accordingly, the controller 400 may be configured to sequentially control the luminance of the first display layer 310 and the transparency of the icon 321 of the second display layer 320.

The controller 400 may store the luminance value of the first display layer 310 and the transparency of the icon 321 of the second display layer 320 in a data map in response to the received amount of light and may immediately control the first display layer 310 and the second display layer 320 according to a set value in response to the amount of light measured by the sensor unit 100.

In detail, according to an embodiment of the present disclosure, the controller 400 may be configured to control the luminance of the first display layer 310 in response to the measured value of an initial amount of external light and to change the transparency of the icon 321 of the second display layer 320 based on the set luminance of the first display layer 310.

The controller 400 may be configured to control the camera monitor systems 10 positioned on the opposite side surfaces in response to the position of a light source. In other words, the sensor unit 100 may measure the position of the light source in left and right directions and the controller 400 may control the luminance of the first display layer 310 of each of the camera monitor systems 10 positioned on the opposite side surfaces and the transparency of the icon 321 of the second display layer 320 based on the measured position.

Figure 3:
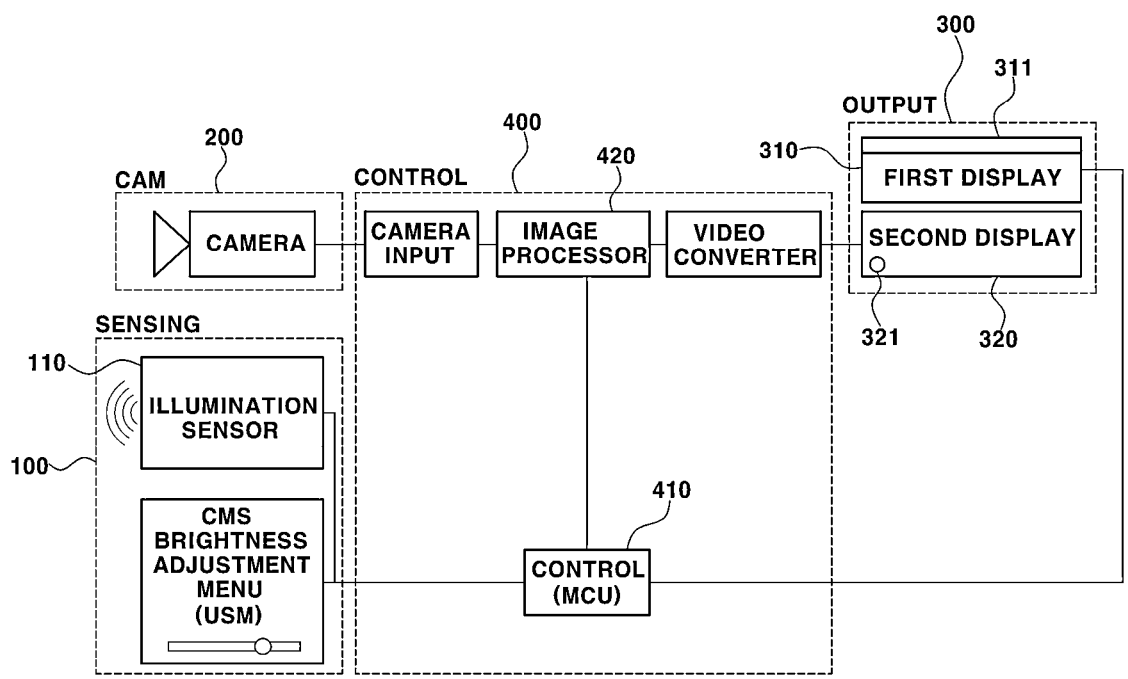
FIG. 3 is a diagram showing the configuration of a camera monitor system for responding to the amount of light according to the present disclosure.

FIG. 3 is a diagram showing the configuration of the camera monitor system 10 for monitoring the outside according to the present disclosure.

The camera monitor system 10 may include a camera unit 200 positioned inside each of two housings or cases positioned on the opposite side surfaces of the vehicle. The camera unit 200 in each housing or case may be configured to photograph side and rear surfaces of the respective side of the vehicle in real time in response to a user request. The display unit 300 may be configured to display the captured image through the controller 400.

According to an embodiment of the present disclosure, the camera monitor system (CMS) 10 for monitoring the outside of the vehicle may include the controller 400. The controller 400 may include a micro control unit (MCU) 410, a camera input circuit, an image processor (IPC) 420, and a video converter. The controller 400 according to the present disclosure may be connected to the camera unit 200 and may receive an image captured by the camera unit 200. The display unit 300 may be configured to display the received camera image data through the camera input circuit, the image processor, and the video converter.

In detail, the MCU 410 may be configured to receive the amount of external light from the sensor unit 100 and to receive an initial luminance value in response to user input. In addition, the luminance value of the first display layer 310 may be set in response to the received initial luminance value and the received amount of light, and the first display layer 310 may be configured to be controlled based on the set luminance value.

The image processor 420 may be configured to receive the amount of external light measured by the sensor unit 100 from the MCU 410 and to control the transparency of the icon 321 displayed on the second display layer 320 in response to the received amount of external light.

In other words, the MCU 410 may be configured to control the luminance value of the first display layer 310 and to simultaneously transmit the measured amount of external light to the image processor 420 in response to the amount of external light measured by the sensor unit 100. In response thereto, the image processor 420 may set the transparency of an icon based on the captured image received through the camera input circuit and to transmit the transparency to the second display layer 320 through the video converter.

According to the present disclosure, the CMS 10 may include the sensor unit 100 coupled to the controller 400. The sensor unit 100 may be configured to measure the position of a light source outside the vehicle and the amount of light applied to the vehicle from the light source. The sensor unit 100 may measure input of a user request. Thus, an initial value such as the luminance or chromaticity of the first display layer 310 in response to the user request, and an initial value of the chromaticity transparency of the icon 321 displayed through the second display layer 320 may be set.

In detail, the sensor unit 100 may include the illumination sensor 110 for measuring the amount of light input to the vehicle, and at least one illumination sensor 110 may be positioned on a front windshield of the vehicle. Thus, the illumination sensor 110 may measure the amount of light input to the vehicle and the position of the light source.

The sensor unit 100 according to the present disclosure may be configured to measure a plurality of signals generated in the vehicle. Thus, the sensor unit 100 may receive an ignition (IGN) signal, a vehicle door signal, a switch signal of the camera monitor system 10 for monitoring the outside, a signal for opening and closing a vehicle door, and the like. In response to each received signal, the icon 321 corresponding to the second display layer 320 may emit light through the image processor and the video converter.

The video converter of the controller 400 may include an on screen display (OSD) generator (not shown). Thus, the OSD generator may generate various types of images of the icon 321 and may transmit the same through the second display layer 320. Here, the icon 321 of data that is generated in the form of OSD on the second display layer 320 through the OSD generator may include character data, graphics data, or the like.

The first display layer 310 and the second display layer 320 may be embodied in various forms such as PDP, LCD, OLED, flexible display, or 3D display. In addition, the display unit 300 may also be configured as a touchscreen and may be used as an input device as well as an output device.

A storage of the controller 400 may store software related to an operation of the display unit 300, various data generated during an operation of the display unit 300, and a character code corresponding to the icon 321.

The storage may be embodied as an electrically erasable programmable read-only memory (EEPROM) and may be connected to the controller 400 using an I2C method. The storage may be configured to store the luminance value of the first display layer 310, which is set in response to the amount of external light of the vehicle, and to store a set value of the transparency of the icon 321 of the second display layer 320. The storage may store the priority of the plurality of icons 321 and may identify the icon 321, the chromaticity of which needs to be controlled, among the icons 321, the transparency of which is controlled according to the stored priority. The storage may be configured to control the icon 321 having a high priority depending on the stored chromaticity. Thus, the first display layer 310 and the second display layer 320 may be configured to be controlled by immediately applying the set values of the luminance and the transparency that are stored in response to the amount of external light measured through the sensor unit 100.

As such, the storage may store the priority of the icon 321 generated by the OSD generator. Thus, the controller 400 may be configured to control the chromaticity of the icon 321 when the icon 321 having a high priority is applied. In other words, the controller 400 may control the transparency of the icon 321 and may simultaneously control the chromaticity of the icon 321 set for a user to easily recognize the icon 321 having a high priority, which is necessarily recognized in an environment around the vehicle. According to an embodiment of the present disclosure, in the case of a blind spot detection (BSD) indicator as the icon 321 having a high priority stored in the storage, even if the luminance of the first display layer 310 is low, the chromaticity of the icon 321 may be configured to be higher than those of other icons 321. The controller 400 may be individually or simultaneously controlled to lower the transparence of the BSD indicator having a high priority than those of other icons 321. In detail, according to the present disclosure, the icon 321 having a high priority may include an icon that directly relates to the safety of the vehicle, and thus may include BSD, door opening, or the like.

As such, during nighttime with a low amount of external light, even if the luminance of the first display layer 310 is lowered and the transparency of the icon 321 is increased, the icon 321 having a high priority may be configured to have higher chromaticity than other icons 321.

In short, the present disclosure provides the camera monitor system 10 for responding to the amount of light, configured for a user to easily recognize the icon 321 even in various environments. The camera monitor system 10 does so by controlling the luminance of the first display layer 310 in response to the amount of external light received through the sensor unit 100, controlling the transparency of the icon 321 of the second display layer 320, and further controlling the chromaticity of the icon 321 having a high priority among the icons 321.

Figure 4:
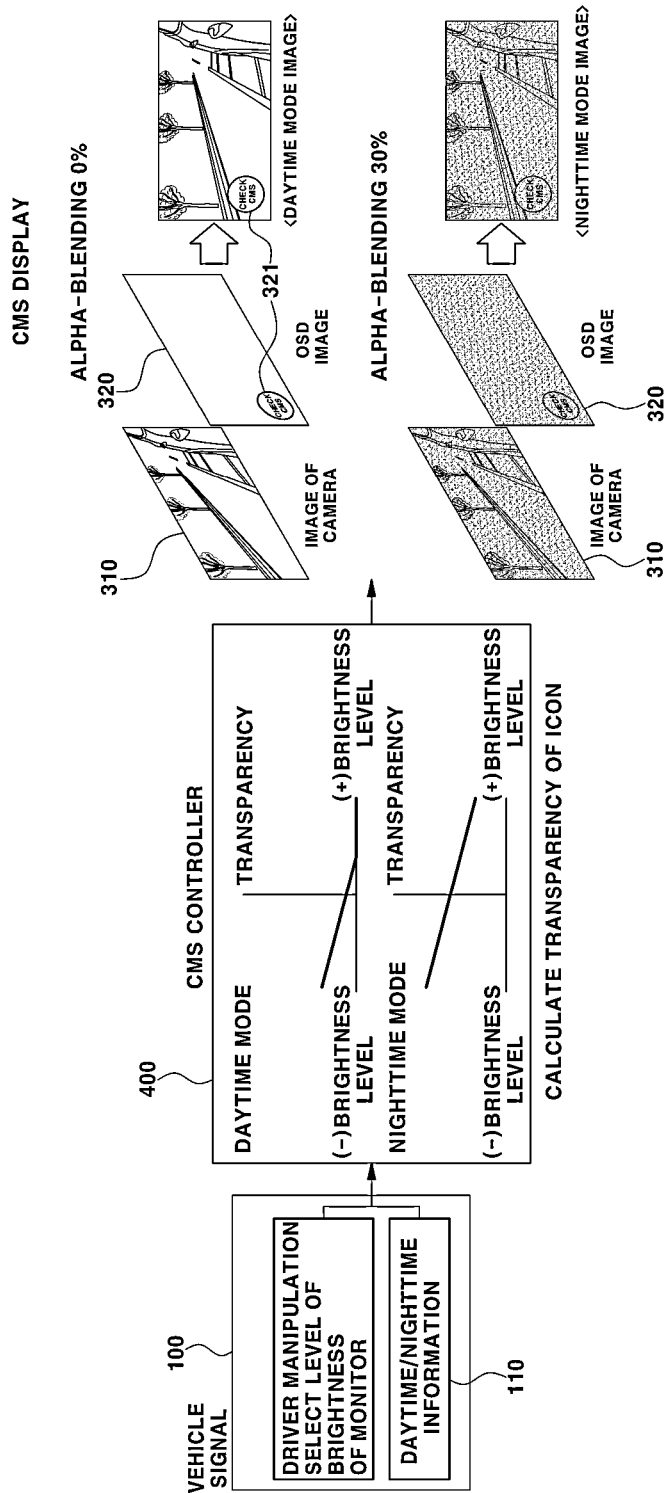
FIG. 4 is a diagram showing flow of control of the transparency of an icon of a camera monitor system for responding to the amount of light according to an embodiment of the present disclosure.

FIGS. 4 and 5 illustrate a control procedure of the camera monitor system 10 for responding to the amount of light according to the present disclosure.

The camera monitor system 10 for responding to the amount of light according to the present disclosure may be configured to simultaneously or sequentially control the first display layer 310 and the second display layer 320 in response to a calculation procedure stored in the controller 400 with respect to an input value received from the sensor unit 100.

The sensor unit 100 may receive the amount of external light and the position of a light source and may include all components for receiving brightness input of the display unit 300 of the user and for measuring an initial brightness value of the display.

In response to the brightness input of the user, the controller 400 may set the luminance of the display unit 300 and the transparency of the icon 321. The controller may control the first display layer 310 and the second display layer 320 in response to the amount of external light measured by the sensor unit 100 and the position of the light source.

The controller 400 may be configured to distinguish between a daytime mode and a nighttime mode of the display unit 300 in response to the amount of external light received from the sensor unit 100. In detail, when the amount of external light is equal to or greater than a first reference value, the controller 400 may set the camera monitor system 10 to the daytime mode. When the amount of external light is less than the first reference value, the camera monitor system 10 may be set to the nighttime mode.

After setting the camera monitor system 10 to the daytime mode or the nighttime mode, the controller 400 may be configured to control the luminance of the first display layer 310 in response to the amount of light measured by the sensor unit 100 and to sequentially or simultaneously control the transparency of the icon 321 of the second display layer 320.

In detail, as shown in FIG. 5, as a luminance value is set in each mode in response to the amount of input light, a table may be stored to calculate the transparency of the icon 321. Thus, the controller 400 may immediately control the luminance of the first display layer 310 in response to the measured value received from the sensor unit 100. In addition, the controller 400 may be configured to change the transparency of the icon 321 of the second display layer 320 in response to the luminance value of the first display layer 310. However, when the transparency of the icon 321 having a value equal to or greater than 50% is applied, the user may have difficulty in recognizing the icon 321, and thus the maximum transparency of the icon 321 may have a value less than 50%.

As shown in FIG. 4, a table for setting the transparency of the icon 321 may be stored for each of the daytime mode and the nighttime mode. Thus, the transparency of the icon 321 of the second display layer 320 may be immediately changed in response to the amount of light (luminance) in FIG. 5.

According to an embodiment of the present disclosure, the luminance in the daytime mode may be set to be higher than the luminance in the nighttime mode. In detail, as the amount of external light is increased, the luminance of the first display layer 310 may be set to be increased. As the luminance of the first display layer 310 is increased, the transparency of the icon 321 displayed on the second display layer 320 may be controlled to be lowered. In contrast, as the luminance of the first display layer 310 is lowered, the transparency of the icon 321 displayed on the second display layer 320 may be controlled to be increased.

As the luminance of the first display layer 310 is increased in the daytime mode, the transparency of the icon 321 may be configured to converge to 0. As the luminance of the first display layer 310 is increased in the nighttime mode, the controller 400 may be configured to store a calculation method to linearly lower the transparency of the icon 321.

As described above, the present disclosure provides the camera monitor system 10 having high visibility in response to change in the amount of external light by controlling the luminance of the first display layer 310 in response to the amount of external light of the vehicle and simultaneously or sequentially controlling the transparency of an OSD (the icon 321) of the second display layer 320.

The present disclosure may achieve the following effects through a combination and a use relationship between the embodiments and the above configuration.'

The present disclosure may provide a display unit having high visibility in response to the amount of external light through a camera monitor system for responding to the amount of light.

The present disclosure may provide an effect of improving the visibility of an icon provided to an OSD as well as improving the visibility by controlling the luminance of an image of the outside.

The present disclosure may provide an effect of improving driving visibility by improving the visibility of an icon having a high priority.

The detailed description is used to exemplify the present disclosure. The description herein is given to show embodiments of the present disclosure, and the embodiments of the present disclosure may be used in various other combinations, changes, and environments. In other words, the present disclosure may be changed or modified within the scope of the concept of the present disclosure disclosed in the specification, the equivalent scope of the given disclosure, and/or the scope of the technology or knowledge in the art. The described embodiment may be changed in various forms required in detailed applications and use of the present disclosure. Thus, the detailed description of the present disclosure herein is merely illustrative and is not intended to limit the present disclosure. The following claims are to be interpreted as including other embodiments.

What is claimed is:

1. A camera monitor system for responding to an amount of light, comprising:
   a sensor unit configured to measure an amount of external light outside of a vehicle;
   a camera unit configured to capture an image of an outside of the vehicle;
   a display unit comprising a first display layer configured to display the image of the outside, captured by the camera unit, and a second display layer configured to display at least one icon and at least partially overlapping the first display layer; and
   a controller configured to set a luminance of the first display layer in response to the amount of external light received from the sensor unit and to change transparency of the at least one icon of the second display layer.

2. The camera monitor system of claim 1, wherein, when the amount of external light measured by the sensor unit is equal to or greater than a first reference value, the controller sets a daytime mode, and when the amount of the external light is less than the first reference value, the controller sets a nighttime mode.

3. The camera monitor system of claim 1, wherein the controller comprises:
   a micro control unit configured to receive data of the amount of external light from the sensor unit and to control the luminance of the first display layer; and an image processor configured to receive the data of the amount of external light from the micro control unit and to set the transparency of the second display layer accordingly.

4. The camera monitor system of claim 1, wherein, when the luminance is controlled in response to the amount of external light measured by the sensor unit, the controller is configured to control the transparency of the at least one icon of the second display in response to the luminance.

5. The camera monitor system of claim 1, wherein the controller is configured to determine importance of the at least one icon and to control chromaticity of the at least one icon having relatively high importance.

6. The camera monitor system of claim 5, wherein the controller is configured to simultaneously control chromaticity and transparency of the at least one icon depending on the importance of the at least one icon.

7. The camera monitor system of claim 1, wherein the controller stores a luminance value of the first display layer in response to the amount of external light.

8. The camera monitor system of claim 7, wherein the controller stores the transparency of the at least one icon of the second display layer in response to a luminance value determined based on the amount of external light measured by the sensor unit.

9. The camera monitor system of claim 1, wherein the at least one icon is positioned on the second display layer and comprises at least one of blind spot detection (BSD) icon, a rear guide line icon, a side guide line icon, or a door opening icon.

10. The camera monitor system of claim 1, wherein:
the first display layer comprises a backlight; and
the controller is configured to control the luminance of the first display layer by controlling brightness of the backlight.

11. The camera monitor system of claim 1, wherein the controller is configured to measure a position of a light source, input through the sensor unit, and to simultaneously or individually control the first display layer and the second display layer, which are respectively positioned at left and right sides of the display, depending on the measured position.

12. The camera monitor system of claim 1, wherein the controller is configured to have a maximum icon transparency of less than 50%.

* * * * *